United States Patent
Vance et al.

(10) Patent No.: US 7,844,215 B2
(45) Date of Patent: Nov. 30, 2010

(54) MOBILE AUDIO CONTENT DELIVERY SYSTEM

(75) Inventors: Jeremy B. Vance, Olathe, KS (US);
Clarence Mitchell, New York, NY (US);
Robert Gowans, Coppell, TX (US);
Kyle W. Johnson, Lawrence, KS (US)

(73) Assignee: Accenture Global Services GmbH, Schaffhausen (CH)

( * ) Notice: Subject to any disclaimer, the term of this patent is extended or adjusted under 35 U.S.C. 154(b) by 676 days.

(21) Appl. No.: 11/890,475

(22) Filed: Aug. 7, 2007

(65) Prior Publication Data

US 2008/0039010 A1 Feb. 14, 2008

Related U.S. Application Data

(60) Provisional application No. 60/836,125, filed on Aug. 8, 2006.

(51) Int. Cl.
*H04H 40/00* (2008.01)
(52) U.S. Cl. .................. 455/3.06; 455/414.1
(58) Field of Classification Search ............... 455/3.06, 455/406, 412.2, 413, 414.1
See application file for complete search history.

(56) References Cited

U.S. PATENT DOCUMENTS

| | | | | |
|---|---|---|---|---|
| 6,816,703 | B1 * | 11/2004 | Wood et al. | 455/3.04 |
| 6,888,929 | B1 | 5/2005 | Saylor et al. | |
| 2001/0037240 | A1 * | 11/2001 | Marks et al. | 705/14 |
| 2004/0077332 | A1 * | 4/2004 | Ephraim et al. | 455/405 |
| 2004/0172254 | A1 | 9/2004 | Sharma et al. | |
| 2004/0224693 | A1 * | 11/2004 | O'Neil et al. | 455/445 |

FOREIGN PATENT DOCUMENTS

WO 2006/076516 7/2006

* cited by examiner

*Primary Examiner*—Tu X Nguyen
(74) *Attorney, Agent, or Firm*—Finnegan, Henderson, Farabow, Garrett & Dunner, L.L.P.

(57) ABSTRACT

The present invention provides the delivery of mobile-capable audio entertainment content. More particularly, the present invention relates to the electronic and mobile delivery of various media content, such as print periodicals and print news articles, by converting them into audio format and enabling such content along with other audio content to be delivered to consumers over wireless telephone networks. Particular embodiments of the invention provide interactive classified advertisement features.

31 Claims, 9 Drawing Sheets

MOBILE AUDIO CONTENT DELIVERY SYSTEM

RELATED APPLICATIONS

This application claims the benefit of priority of prior co-owned and co-pending U.S. provisional patent application Ser. No. 60/836,125, filed Aug. 8, 2006.

FIELD OF THE INVENTION

The present invention relates to the delivery of mobile audio entertainment content. More particularly, the present invention relates to the electronic and mobile delivery of various media content, such as print periodicals and print news articles, by converting them into audio format and enabling such content along with other audio content to be delivered to consumers over wireless telephone networks.

BACKGROUND OF THE INVENTION

Current research indicates that over 150 million people in the United States read magazines and nearly the same amount read newspapers there. All told, these Americans presently spend about the same amount of money on magazines and newspapers as they do on movies and video games. While overall media consumption continues to grow briskly in the United States, however, readership of newspapers and magazines has shown a continued decline as consumers increasingly migrate to more on-demand, mobile and interactive options to suit their hectic lifestyles. Similar market trends have been identified in other countries and markets throughout the world, with electronic media consumption steadily displacing consumption of traditional print media.

Another identifiable trend is the growth in mobile entertainment services and technologies that enable consumers to tap into large blocks of their day to multi-task. The average person spends many minutes per day commuting alone in their car, exercising at a gym, waiting in line, or traveling. For example, consumer technologies and services that enable consumers to download music onto their cell phones and then play back that music have shown significant growth over the last few years and are projected to continue that growth. Additionally, the recent growth of podcasting indicates that consumers are continuing their search for new forms of innovative mobile entertainment. It is estimated that more than 6 million Americans have listened to podcasts, which are recorded audio files of broadcasts, radio shows, interviews, and the like, via either computer download or mobile digital music (e.g., MP3 and other digital audio format) players.

While there currently is an extremely high volume of digital print content (such as made available by various news agencies or publishers), there currently is no high-volume and high-quality platforms that enable such publishers to convert such content for audio consumption. Most publishers simply are not capable of, or otherwise have not demonstrated the technical expertise, resources, or desire to build the infrastructure for creating, storing and distributing such audio content at a large enough scale to be profitable. It would be advantageous if traditional publishers could be provided with a system that may be managed by a third-party which enables them to leverage their existing content and format to reach new customers as digital audio content suitable for mobile delivery and/or consumption.

Conventional wisdom is that consumer interest in portable music and podcasting downloading services will continue to fuel the growth of mobile media and entertainment purchases by consumers. The challenge thus remains, not only to develop new content suitable for mobile entertainment, but also to develop new mechanisms for delivering that content to mobile consumers. While portable digital media players are capable of storing hundreds of hours of audio files and video files, it is nonetheless necessary for the user of the mobile device to "synchronize" the device periodically in order to download new material. Typically, this synchronization includes attaching the digital media player to a personal computer, and then downloading content from that computer (or the Internet) to the digital media player. Typically, this process requires the user to connect to their computer physically in this manner whenever they want new content. Thus, current digital media players do not provide true on-the-go and on-demand access to various types of media content.

While it is estimated that there are over 200 million existing wireless telephone service subscribers in the United States, only a small minority of those subscribers currently utilize services offered by their mobile telephone service provider for digital entertainment media. While certain mobile telephones may allow users to download music and other pre-recorded audio content or video content to their telephone for simultaneous or later playback, for example, such devices are only currently a small percentage of those in service. These service offerings by wireless telephone service providers, therefore, have only a small sub-population of potential consumers. Further, the currently provided content has not tapped into the large stores of digital content that are available via other sources, such as the Internet. While many wireless customers may be interested in service offerings relating to portable entertainment, they may not have the desire to invest in a new telephone or change their current service plan to support data transmission in order to gain this capability.

Thus, there remains a need in the art for systems for providing mobile audio content delivery services to the large body of potential consumers that utilize mobile telephones. Particularly, such systems should enable the linking of wireless carriers, content providers, and consumers in a manner that permits a high volume of mobile-capable audio content to be developed and delivered to a high volume of consumers with low implementation barriers to consumers. Additionally, there is also a need for such mobile audio content delivery systems to be able to provide a delivery of digital entertainment and other (e.g., business, education, reference, etc.) media on-demand to various consumers regardless of the type of mobile telephone device that they have.

SUMMARY OF THE INVENTION

In this regard, it is an object of embodiments of the present invention to provide a mobile audio content delivery system, including networking platforms and computing and communication components, that provides portable content services wherein entertainment and other content could be downloaded, streamed, or otherwise played over any mobile telephone or other mobile handset. In this regard, mobile-capable audio content could be delivered using a combination of 2G and 3G voice and wireless data communication technologies to allow wireless service providers, content providers, or other independent entities to offer mobile audio content delivery services to their entire subscriber base as opposed to only a targeted subscriber base required to have newer or specialized telephone units.

Additionally, it is an object of the present invention to provide a mobile audio content delivery system that enables publishers of print media and other content producers to reach a broad audience of potential consumers while permitting the targeting of key consumers for advertising purposes.

Furthermore, it is an object of the present invention to provide a solution that allows existing wireless customers to access and listen to audio recitals of current newspaper and magazine articles of their choice using their existing mobile telephone.

The mobile audio content delivery system provided in embodiments of the present invention enables existing wireless consumers to access original audio content and audio content converted from print content regardless of their phone type or network affiliation, and does not require users to invest in a new mobile telephone unit or an other specialized device in order to access content from their favorite publications. Additionally, the systems of the present invention enable a user to multi-task and listen to desired mobile-capable audio content in a hands-free and eyes-free manner. Thus, users can listen to the content while engaged in other time-consuming tasks, such as commuting, exercising, or traveling, and without the user having to carry with them a device tasked solely for digital media entertainment (such as a portable digital media player). Additionally, the systems in the present invention provide users with a familiar interface to the digital media content that utilizes voice commands, touch-tone commands, or mobile web "click" commands to navigate among, search, select, and, ultimately, consume mobile-capable audio content. In this regard, users can select and review the content without learning a new interface or navigation skills. Additionally, systems of the present invention place users in control of their content by enabling them to identify and/or select articles, stories, or other publications they want whenever and wherever they have time to do so. Users, therefore, do not have to remember to allocate time in their busy days to stop and synchronize a device or download media files well in advance of when they intend to listen to them.

A mobile audio content delivery system according to embodiments of the present invention contains three basic elements, a mobile audio content delivery network, a wireless communication network, and various content producing inputs (e.g., publishers). The wireless communication network has a plurality of subscribers each having a mobile communication device (e.g., a mobile telephone). Typically, the wireless communication network comprises any type of mobile, or cellular, telephone network, and, in particular, the wireless communication network optionally may be operated by a service provider that desires to provide their subscribers with the option to utilize the services of the mobile audio content delivery network. Thus, it should be appreciated that the mobile audio content delivery network and wireless communication network may operate in partnership, or operate independently of one another, to provide mobile-capable audio content services to mobile telephone service subscribers. In particular, the system may connect the mobile audio content delivery network with various different wireless communication networks to provide a mobile-capable audio content service as an independent service to mobile telephone subscribers of the different wireless communication networks.

The mobile audio content delivery network includes a content acquisition system that collects digital print media and digital audio media, and uses automated text-to-speech ("TTS") transformation tools to convert the print media into synthesized speech files "reading" the print content. This converted print content and other audio content is stored in a content database, wherein it may later be accessed on-the-go and on-demand by mobile subscribers utilizing a multi-modal user interface.

Embodiments of the present invention can be adapted to utilize various alternative revenue models for the mobile audio content delivery system. A first such revenue model includes a subscription model where subscriber consumers pay a monthly subscription rate (e.g., collected by the mobile audio content delivery network) in order to get access to specific content. In such a revenue model, various levels of subscription could be set up so as to provide access to "standard" content for a first fee (or for free) and particular areas of "premium" content for additional and/or higher fees. A second such revenue model could rely upon advertising revenues. The cost of providing the content to the customer by the mobile audio content delivery network in this second model would be supported by advertising revenue being received by publishers. As explained further herein, a significant feature of embodiments of the present invention that utilize advertising revenue model is that the mobile audio content delivery network can be designed to allow advertisers to better target mobile consumers such that offering those targeting advertising capabilities may be used as a way to support the costs of delivering those services and generating profit.

Additionally, it should be understood that when utilizing a revenue model based upon advertising fees, the systems optionally may be adapted to employ click-through or speak-through advertising, wherein additional fees are charged to advertisers depending upon whether and how much customers exposed to the advertisements interact in some way with the advertisement. For example, where an "opt-out" is provided for subscriber listeners to bypass an advertisement, advertising fees could increase based upon how long, if at all, the average customer listens to a subject advertisement. Alternatively, for example, a particular advertisement could be interactive where it could say, for example, "Press '7' to receive more information on this product" which, if initiated by the subscriber listener, would cause a text message, email, or other follow up communication to be sent to the user's telephone for later review. Subscriber interaction with an advertisement in this manner could likewise be used in determining advertiser fees.

Since delivery of audio content in mobile audio content delivery systems according to embodiments of the invention utilize cellular telephones that, by their nature, are generally associated with a single user (and thus a single target consumer), tracking of usage data by the mobile audio content delivery network makes it possible to draw conclusions regarding the demographics of particular consumers. Understandably, this also makes it possible to target advertisements effectively. If an advertiser were to place a print advertisement in an international or national large circulation print publication (e.g., Newsweek or Time magazines), it is likely that a large portion of the readers of that publication will skip over the advertisement simply because the publication has such a diverse audience. The present invention as described herein, however, enables content from such large and diverse publishers to be used as a vehicle to deliver targeted advertising.

In this regard, a first aspect of the invention relates to a mobile audio content delivery ("MACD") system for collecting and converting print media and delivering said media in the form of audio content to a plurality of subscribers. The MACD system includes one or more wireless service provider networks that provide wireless communication access to the subscribers via mobile devices. The wireless service provide network includes a mobile telephone core network. The MACD system also includes one or more print media input sources that produce the print media, and a MACD network in electronic communication with the wireless service provider networks. The MACD network has a content acquisition subsystem adapted to collect the print media from the input sources. This content acquisition subsystem includes a content processing engine for transforming the collected print media into audio content files. The MACD network further has a content repository database for storing the audio content files, and means for delivering the audio content files to the mobile devices of the subscribers on demand via the wireless service provider networks. The means for delivering the audio content files includes a multi-modal interface that enables the subscribers to use different mechanisms for browsing, navigating, and selecting desired audio content files from the content repository database and playing back the desired audio content files.

A second aspect of the invention relates to a MACD process for collecting and converting print media and delivering the media in the form of audio content to a plurality of subscribers. This MACD process includes establishing a MACD network where that network includes a content acquisition subsystem, a content repository database, and means for delivering audio files, and where that subsystem includes a content processing engine. The process further includes collecting digital print media with the content acquisition subsystem from one or more input sources electronically. The collected digital print media are transformed into audio content files with the content processing engine, and those files are stored in the content repository database. The stored content files are tagged and cataloged in the content repository database according to content categories. Also, the process includes receiving requests from subscribers via a wireless service provider network. The wireless service provider networks provide wireless communication access to the subscribers via mobile devices of the subscribers. These requests relate to particular audio content files stored in the content repository database. Finally, the process includes delivering the particular audio content files from the content repository database via the wireless service provider network to appropriate mobile devices for appropriate subscribers making the requests. In the process, the means for delivering the audio content files includes a multi-modal interface that enables the subscribers to use different mechanisms for browsing, navigating, and selecting the particular audio content files from the content repository database during the requests.

The various embodiments of the invention having thus been generally described, several illustrative embodiments will hereafter be discussed with particular reference to several attached drawings.

DETAILED DESCRIPTION OF THE PREFERRED EMBODIMENTS

Figure 1:
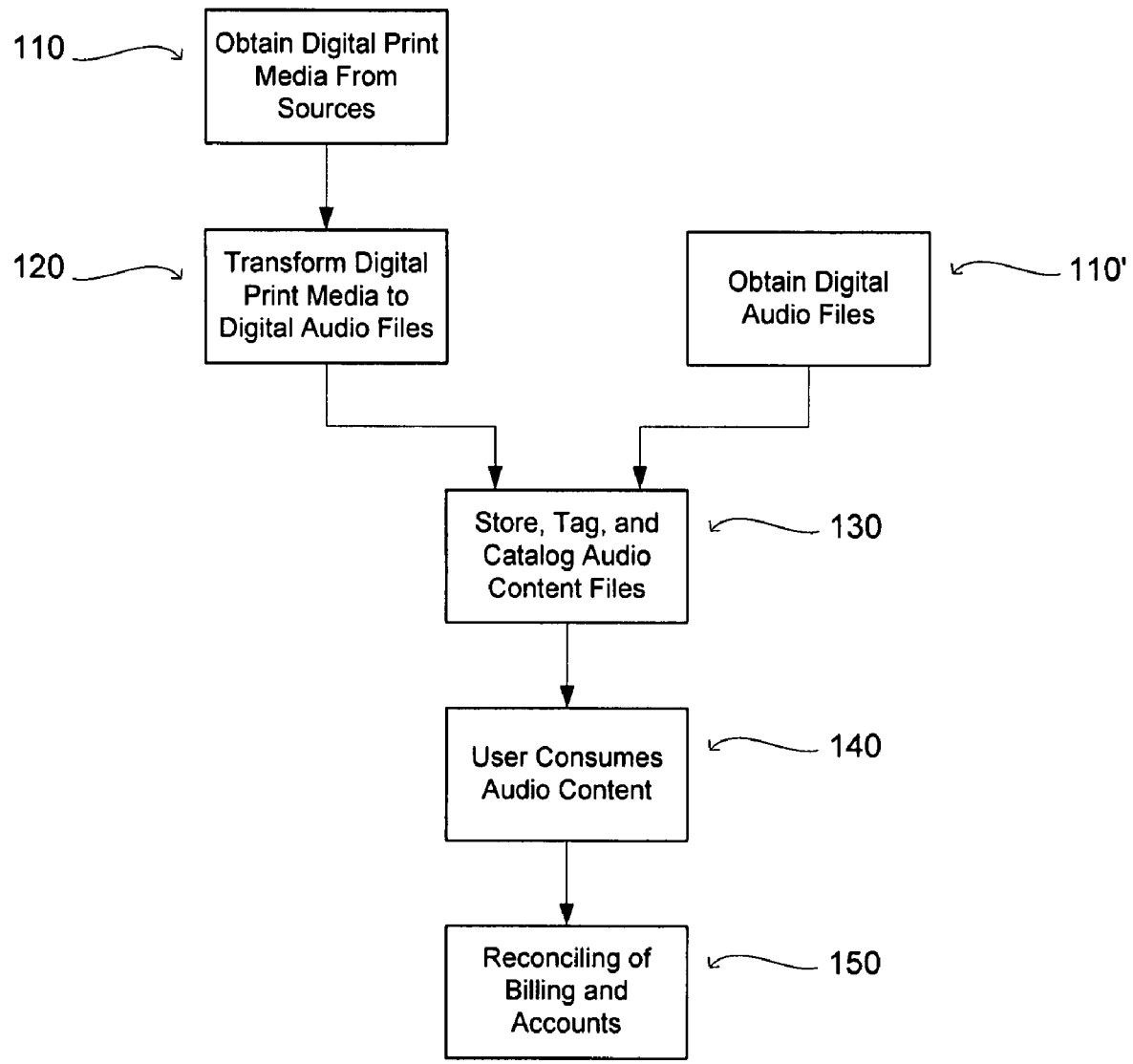
FIG. 1 is a flow diagram depicting a mobile-capable audio content development and delivery process according to an embodiment of the present invention.

A first aspect of the present invention includes a process 100 for developing and delivering mobile-capable audio content to subscriber consumers using a mobile audio content delivery ("MACD") system of the present invention. The mobile-capable audio content delivery process 100 can be conceptualized as first having the MACD system obtain print media in various digital forms from content producers at step 110. Next, at step 120, the content is transformed from print digital media into a synthesized spoken audio recorded in a digital media format. Preferably, the majority and/or all of the content in print digital format is converted via electronic TTS technologies that provide automated simulations of human speaking voices reading the digital print media. Optionally, of course, real-life celebrity or other syndicated readers can alternatively be utilized to record readings of certain print media into an audio file. Understandably, however, the celebrity or syndicated readers will not be suitable for all situations as they will necessarily insert a lag-time into the process for converting digital print media into digital audio media and significantly increase costs. Additionally, the mobile-capable audio content developed in steps 110 and 120 could be supplemented with other content in forms other than text, such as content already in audio and/or video format (pre-recorded radio shows, podcasts, commercial advertisement announcements, etc.). In this regard, at step 110' the process 100 may obtain digital audio files (i.e., content already in digital audio forma) for use by subsequent steps of the process 100.

As depicted, step 130 then proceeds with the mobile audio content delivery system tagging, cataloging, and storing the collected content in appropriate databases such that they be later accessed by subscriber consumers as needed. As will be readily appreciated by ones skilled in the art, the mobile-capable audio content could be saved in a plurality of electronic databases as digital audio files that may be quickly searched to access particular content via metadata tags associated with each such digital file.

Next, at step 140, the process 100 proceeds to deliver the mobile-capable audio content to a plurality of subscriber consumers via their own respective mobile devices (e.g., mobile telephones). In most preferred embodiments of the present invention, it is anticipated that the mobile-capable audio content will be made available via a variety of mechanisms. For example, a first mechanism could include an interactive voice recognition ("IVR") navigation module (such as is commonly encountered in many contemporary telephone help lines) serving as the interface for a computer-driven menu system. Additionally, consumers could also be provided with the option of utilizing the mobile web capabilities of their device/phone to browse various menus to review and select audio content. Similarly, users could be provided with a third mechanism for selecting content which takes advantage of various text messaging capabilities (such as SMS or MMS messages sent daily to their customer serving as an updated table of contents). In using this third mechanism, users may be provided the capability to define profiles, such as via a web site Internet portal associated with the MACD system, that define the type and timing of such instant messages.

Regardless of how a particular consumer selects a particular piece of audio content, that content is thereafter consumed at step 140 by the user through one or more of a plurality of mechanisms depending upon, for example, the capabilities of the particular subscriber consumer's mobile device, the limitations of his mobile telephone service plan, the limitations of mobile network access at his present location, and user preferences. For example, a first mechanism for consumption of the downloaded digital audio content can comprise playing that content over the mobile telephone's voice network during the course of a voice telephone call. A second alternative mechanism could include streaming the appropriate audio content files via unicast over a data network call to the user. Furthermore, the selected digital audio content could be downloaded via a data call or mobile web browsing, cached (or stored), and then played back locally by the subscriber immediately or at a later time. Such alternative mechanisms for accessing the content according to embodiments of the invention, and the system elements for enabling such mechanisms, are described in further detail below.

Process 100 concludes at step 150 with customer account reconciliation. As will be described in further detail below, there are various mechanisms by which a provider of such a MACD system can generate revenue from consumer end users accessing content via the system. Further, it should be apparent that the various publishers that ultimately supply the content delivered via the system will want to be compensated for the use of their respective content. Additionally, mobile telephone network service providers will also want to be compensated for the use of their data networks (unless, of course, the subscriber consumers of the MACD service compensate those mobile telephone service providers directly, such as by using "minutes" purchased independently via a service plan in the course of making a voice and/or data call in conventional manner to the MACD network). In this regard, step 150 denotes the tracking, cataloging and reconciling of content use and delivery on a publisher by publisher basis and on a consumer by consumer basis in order to reconcile charges between the various entities described above.

Understandable, the use of an automated TTS engine to transform digital print medial content to audio format will sometimes cause errors to occur in the transformation. For example, it is possible that certain words will not be accurately pronounced (such as proper names and acronyms). Thus, the transformation at step 120 can optionally include a sub-step comprising a review of the transformed content wherein a person listens to the automatically created audio file while simultaneously reading the original print source of the content. This person can thereby note and flag for correction any apparent errors in the automatically generated audio content.

Figure 2:
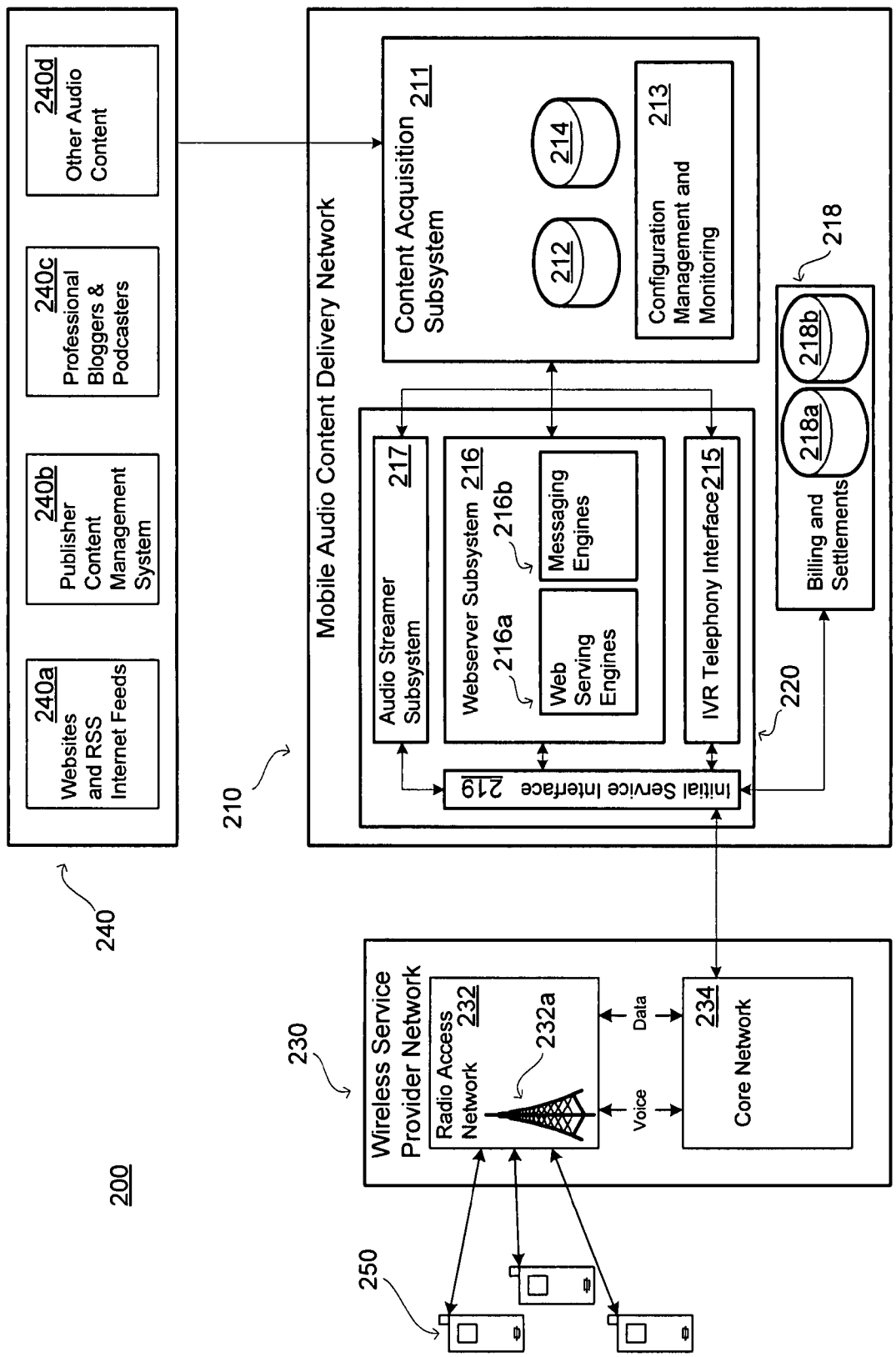
FIG. 2 is a schematic diagram showing a mobile audio content delivery system according to an embodiment of the present invention.

Turning now to FIG. 2 there is depicted in schematic form an example of a MACD system 200 adapted to compile and deliver mobile-capable audio content according to a first embodiment of the invention. As depicted in FIG. 2, system 200 includes a mobile audio content delivery network 210 in electronic communication with a wireless service provider network 230. While not depicted in FIG. 2, it should be appreciated that more than one wireless service provider network 230 may be used in embodiments of the invention. The wireless service provider network 230 may be, for example, any type of suitable mobile telephone network operated by a commercial service provider. This service provider could operate independent of the operator of the mobile audio content delivery network (i.e., a "MACD service provider"), or in partnership to provide its mobile phone subscribers with a service bundling option to utilize the services enabled by the MACD network 210. In certain particular embodiments of the invention, the MACD service provider operates the MACD network 210 independently of any mobile telephone service provider, and instead enables subscribers to its mobile audio content delivery services to access its content via any suitable wireless service provider network regardless or the service provider or carrier.

For example, wireless service provider network 230 could be any suitable network as is commonly used in conventional commercial cellular telephone networks. Typically, such a network would include a radio access network 232, including a plurality of radio communication towers 232a and supporting equipment for enabling those towers to communicate with mobile electronic devices 250 (e.g., a mobile telephone, PDA, etc.) as they move among carious towers 232a arranged into a cellular network, and core network 234 that provides various features and services to the mobile electronic devices in communication with the radio access network. As depicted in FIG. 2, any one wireless communication network 230 may be in communication with one or more mobile devices 250, which mobile devices can include any type of mobile device (cell phones, PDAs, etc.) supported by that network 230.

The core network 234 of the wireless communication network 230 as depicted in FIG. 2 therefore could include various conventional subsystems found in a conventional CDMA, GSM, TDMA, or other types of mobile telephone networks that are used to provide standard service features to cellular customers. While subsystems other than those necessary to achieve mobile telephony voice calls via the network 230 are not necessary for implementation of embodiments of the present invention as herein described, many common types of such subsystems would of course likely be present in the network 230 of a commercial mobile telephone service provider. For example, the core network 234 could include an assisted GPS subsystem, a voicemail subsystem, and a push-to-talk subsystem although such subsystems provide no functionality ultimately necessary for mobile audio content delivery according to embodiments of the present invention.

It should be appreciated after reading the full description of the invention herein, however, that it will be advantageous for the core network 234 to have certain communication subsystems present in addition to standard telephony subsystems, which additional subsystems will enable subscriber consumers connecting via network 230 to be able to use various different mechanisms for communicating with the MACD network 210. For example, if the core network 234 had a short messaging service center subsystem ("SMSC"), subscriber consumers having suitably equipped mobile devices could utilize text messaging to interact with the MACD network 210 as described below. Likewise, if the core network 234 had a multi-media messaging service center subsystem ("MMSC"), subscriber consumers could utilize photo or video messaging features to interact with the mobile audio content delivery network 210. A WAP or other mobile wireless networking protocol subsystem would enable, for example, mobile web browsing or other data transmissions. In this regard, it should be understood that how a particular subscriber consumer interacts with the MACD network 210 will be necessarily limited by the capabilities of their mobile device 250 and the network services that are available to them at any given time.

As depicted in FIG. 2, the MACD network 210 is in communication with various content sources 240. The content sources 240 could provide printed content from publisher websites and RSS feeds from the Internet 240a, print content stored in electronic publisher content management systems 240b, content from professional bloggers or podcasts 240c, and other content 240d already in audio form (such as provided by a publisher, or by advertisers in the form of commercial announcements).

These various types of content from content sources 240 are communicated to the MACD network 210 at various times (such as by daily updates requested by the mobile audio content delivery network, "crawling" of the Internet, updates pushed by the publishers to the mobile audio content delivery network, and the like) where they are handled by the content acquisition subsystem 211 of the network 210. In situations where the newly received content is already in audio format, the content acquisition subsystem 211 will recognize this audio material and store and tag this content (according to acquisition and processing rules stored in a configuration database 214) in an appropriate content database 212. However, where the material is in digital text format, a content acquisition engine 211 of subsystem 211 typically will utilize TTS applications to automatically convert the digital print copy into a digital audio file. For example, content acquisition subsystem 211 can utilize the TTS capabilities of commercially available digital audio content creation tools such as the Speechify application commercially offered by Nuance Communications Incorporated or other like applications such as those commercially offered by Fonix Speech Corp. As audio files are created by the digital audio content creation tools of the content acquisition subsystem 211, those audio files are also stored in the content database 212 and tagged as appropriate. In this manner, the source content database 212 is built to include a variety of content that would be attractive to a broad audience of potential customers.

Understandably, as noted above, if desired digital audio content files can be created in conventional form by utilizing an actor or other person to read particular print content for recording. Such conventionally created digital audio content would likewise be collected, tagged and stored in the content database 212 as dictated by the various configuration rules of the configuration database 214.

Also as depicted, content acquisition system 211 would further include a configuration management and monitoring interface 213 that would enable administrators to review and monitor content stored in content database 212 and to assign various configuration rules (to be stored in configuration database 214) that configure how the TTS tool and other engines of the content acquisition subsystem 211 collects, processes, tags, stores, and otherwise handles certain audio content. Also, newly created files stored in content database 212 could optionally be reviewed for transformation accuracy relative to the original print content by an administrator tasked with that job using the interface 213. Further aspects, components, and features of the content acquisition subsystem 211, with databases 212 and 214 being broken into multiple databases and interface 213 being split into multiple interfaces serving various purposes, is described in further detail below with respect to FIG. 3.

The MACD network also includes means 220 for mobile users to interface with the mobile audio content delivery network 210 and browse and retrieve desired content from the content database 212. Such means would include an initial service interface 219 that interacts directly with (consumer generated) requests from the wireless communication network 230 and one or more back end components enabling the particular types of navigation and communication by subscriber consumers. These components could include, as depicted, an audio streaming subsystem 217, a web server subsystem 216, and an IVR telephony interface 215. Browsing and/or content requests from subscriber consumers are fed as needed to various different components of the MACD network 210. For example, a web server system 216 could be utilized to provide multi-channel user interface capabilities with the content database (such as when a potential user navigates through content utilizing a WAP wireless web gateway via a web serving engine 216a or text messaging via a messaging engine 216b as depicted). Additionally, an IVR telephony interface 215 can be utilized where a particular mobile user desires to browse and navigate the content repository utilizing IVR voice commands over a standard voice telephone call from a wireless telecommunication network (e.g., network 230). Additionally, the mobile audio content delivery network 210 could also include an audio streamer system 217 configured to provide audio media content via digital unicasts.

The particular embodiment of a MACD network 210 as depicted in FIG. 2 also includes a billing and settlements subsystem 218 that interacts with the service interface 219. Subsystem 218 monitors which users (i.e., devices 250) of the wireless communication network 230 utilize which content from the content acquisition subsystem 211 and cross-references that monitored usage with subscriber, content provider, and advertiser agreements data stored in agreements database 218a. The cross-referencing is used to create usage records and billing notations that are stored in a settlements database 218b such that they can be used for billing reconciliation. In this regard, appropriate payments can be arranged to content sources 240 and (depending upon billing arrangements with the end user consumers) bills for the various subscriber consumers and advertisers of the MACD network 210 can be adjusted as appropriate. Similarly, compensation can be determined for the content providers in situations where their compensation for use of their content is variable based upon the amount of times it is delivered to subscriber consumers.

Figure 3:
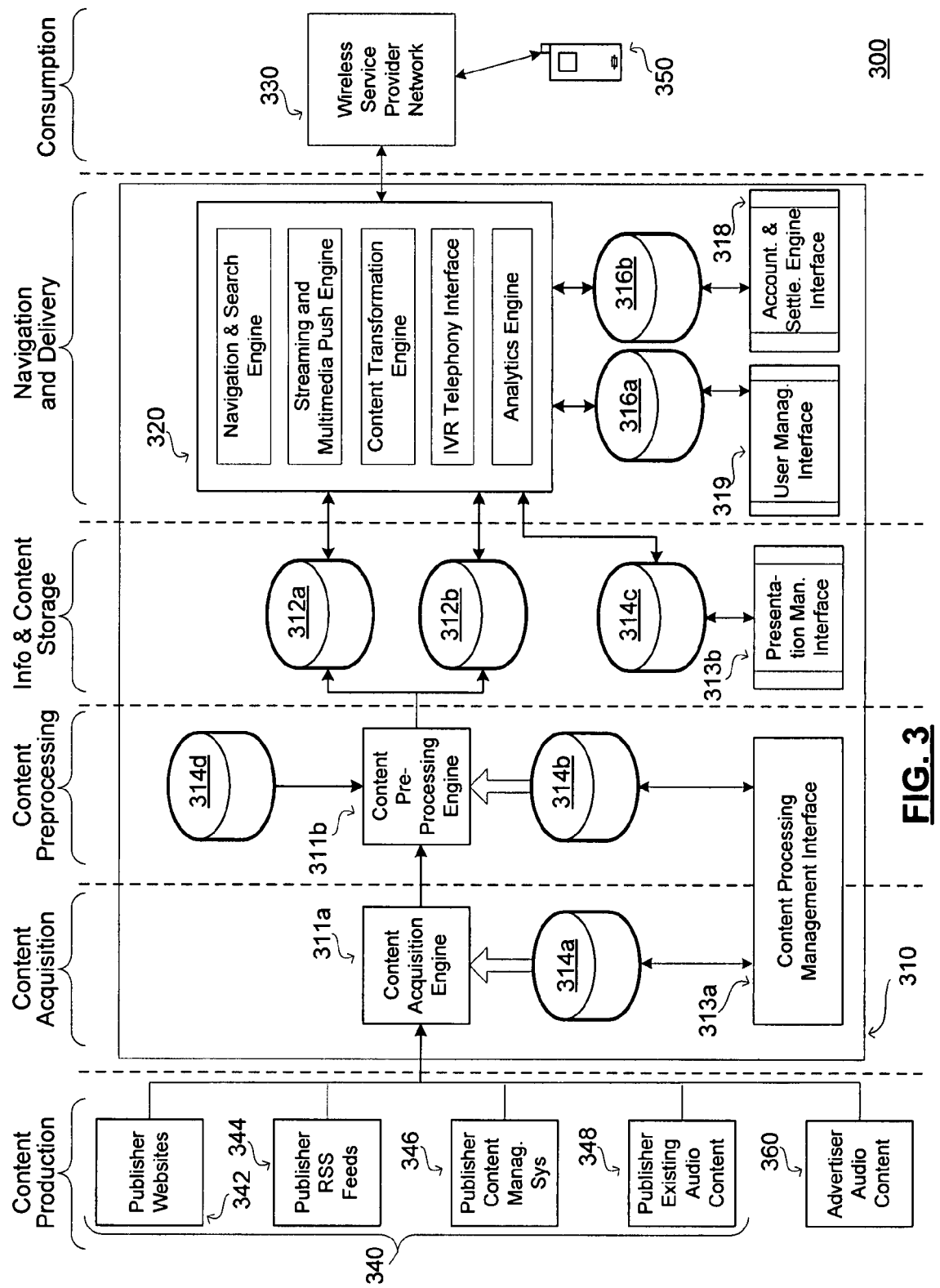
FIG. 3 is a schematic diagram showing a detailed mobile audio content delivery system and related computing network according to one advantageous embodiment of the present invention.

Turning now to FIG. 3, there is depicted a functional component overview of another embodiment of a MACD system 300 according to the present invention. In FIG. 3, the content flows from the content production stage (at the far left), through subsequent stages of content acquisition, content preprocessing, information and content storage, navigation and delivery, and finally to a consumption stage (on the far right) where mobile-capable audio content is delivered to mobile devices 350 of a subscriber consumer. As with the system 200 of FIG. 2, MACD system 300 contains three basic elements, a MACD network 310, a wireless communication network 330 (for communicating with mobile devices 350 of end user subscribers as depicted), and various content producing inputs 340. It should be understood that FIG. 3 depicts the MACD network 310 in additional detail relative to FIG. 2 and therefore should be considered in conjunction with FIG. 2 as an example of various components and elements, including multiple databases, engines, and interfaces according to one particularly suitable embodiment of the invention, for performing the particular functions and providing the particular features described herein.

As shown in FIG. 3, the content inputs 340 can be of various types from various different publishers, including print stories/articles or other print content on publisher's website 342, RSS ("really simple syndication") feeds 344 of print media content, print content stored on legacy content management systems 346 of publishers, or digital audio content 348 already made by a publisher. RSS is a standardized form of XML-encoded text commonly used in publication to enable the rapid exchange of publication materials in a common electronic format. It provides users with a link to a printed publication in electronic format and provides a title and a short synopsis. Content management systems 346 are the internal systems used by the publishers to store their content. Thus, it is particularly preferred for the content acquisition subsystem in embodiments of the present invention to have direct electronic access to such content management systems and the stored content. Such systems often contain, in addition to the information, meta data concerning, for example, when the article was written, how many words it has, when it was first published, authors, keywords, and the like. Publisher audio based content 348 includes any kind of pre-recorded audio content, including podcasts, clips of radio programs, and the like.

Advertiser audio content 360 comprises audio advertisements (similar to radio advertisements, including traditional 15-second and 5-second spots). Such advertisements can be sourced from publishers (e.g., where a publisher requires or requests that a certain advertisement be run with certain piece of print content upon mediacast), or from third party advertisers. Thus, as shown in FIG. 3, advertiser content in the form of advertiser digital audio files is also a source of content that can be regularly transferred into the content acquisition subsystem of the mobile audio content delivery network 310 as described below.

Thus, it should be apparent that content sources can take the form of print media (e.g., newspapers, magazines, and on-line text content), audio content (e.g., podcasts, music (i.e. individual songs, albums or radio programming), and audio from talk/news radio and TV programming), location-based information (e.g., weather and/or traffic reports, restaurant and entertainment listings and guides), email, internet web logs (i.e., "blogs"), interactive educational or self-help courses (e.g., continuing education, textbook supplements for college and high school, language learning, and religious materials), business/work content (e.g., real-time information (e.g., stock quotes, breaking corporate news), real-time company data (e.g., sales metrics), and analyst reports and industry research, and company training courses). Further, in addition to traditional publisher content converted into audio mobile-capable audio content, embodiments of the present invention could additionally support and distribute other types of audio content. Such content can include traffic and weather forecasts, enterprise and commercial training and education materials, university lectures for students, restaurant entertainment listings and guides, and the like.

As shown in FIG. 3, the media files obtained from the content inputs 340 and advertiser audio content 360 flow into various elements of the MACD network's content acquisition subsystem, which, in the particular embodiment depicted includes both a content acquisition engine 311a and a content preprocessing engine 311b. In the content acquisition stage as depicted, the entertainment content is collected from the various inputs 340 and advertisers 360. In the network 310 as depicted, the collection is a largely automated process undertaken by the content acquisition engine 311a which collects contents via various mechanisms from various inputs as dictated by content acquisition rules stored in a content acquisition database 314a. The rules in this database are defined and revised periodically by administrators of the network 310 using a content processing management interface 313a.

In accord with the preferred embodiments of the invention as depicted in FIG. 3, the process of the content acquisition subsystem acquiring various types of content from various different publishers is a largely automated process. The content acquisition engine 311a forms an important part of the content acquisition subsystem, and is a computer program that is adapted to identify and collect digital print content from the content inputs 340 of participating publishers, and optionally advertising content 360. The engine 311a is preferably capable of obtaining new content on a scheduled "pull" basis and on an unscheduled "push" basis without requiring significant interaction by administrators of the mobile audio content delivery network 310. For example, new print content can be downloaded on a scheduled basis (such as from publisher's websites or content management systems) and converted to a daily feed of headlines, or content can be actively submitted by publishers as desired, such as for breaking news stories. The operation of engine 311a can be controlled by administrators of the MACD network 310 using interface 313a to define acquisition rules for how and from where to collect print and/or audio content, which rules are then stored in acquisition engine database 314a where they are continuously available to engine 311a.

Next, in the content preprocessing stage, the media file inputs collected by the content acquisition engine 311a flows into the content preprocessing engine 311b. This content preprocessing engine 311b performs any necessary TTS conversions for the content acquisition subsystem, and engine 311b will typically comprise a commercial TTS conversion application. The TTS application will communicate with a lexicon database 314d to convert digital media print content into audio format according to various preprocessing rules contained in preprocessing rules database 314b.

The lexicon database 314d is specifically adapted for the particular TTS conversion application selected, and contains the various sounds, voices, and other components that support the translation of print media content into synthesized spoken audio content by the content preprocessing engine 311b. Additionally, the preprocessing rules database 314b is also accessed by the preprocessing engine 311b during content preprocessing. Database 314b enables administrators of the mobile audio content delivery network 310 to define specific content preprocessing rules relating to how certain printed words will be treated by the content preprocessing engine 311b under certain circumstances. This, for example, allows augmentation to the lexicon database 314d for the pronunciation of words on a context-related basis. For a frequently appearing but unusual name of an individual, such as the name of a sports star that regularly appears in articles relating to sports, the name can have a defined pronunciation in the rules database 314b. Similarly, a name could have multiple pronunciations and the rules database 314b can be utilized by administrators to define various context based rules that determine when to use one pronunciation relative to the other. Additionally, for example, some acronyms are commonly pronounced similar in manner to a spoken word while other acronyms are spoken by reciting the individual letters making up the acronym. The rules in the preprocessing rules database could likewise be used to identify such rules on a context-sensitive basis in order to provide an audio recording having the most realistic synthetic spoken recitation of the original print content being processed.

In this regard, the content preprocessing engine 311b according to preferred embodiments of the invention has the capability to handle TTS conversions phonetically on an as-needed basis. The rules database 314b enables the engine 311b to know whenever it encounters a particular text string whether to utilize a perfect word match as defined by the preprocessing rules database 314b or to sound it out using the standard rules of the TTS conversion application (defined in lexicon database 314d) depending upon the type of content (subject area, content provider source, etc.) that is being processed.

Content acquisition subsystem of network 310 additionally includes a processing management interface (e.g., a front end application for use by administrators) that enables users to interact with the scheduling and source database 314a and the preprocessing rules database 314b. Understandably, while content preprocessing engine 311b converts incoming print media into synthesized audio media in a queued fashion, it may be necessary or desired at times to convert certain print media into digital audio media on a faster basis. For example, the processing management interface 313a can allow administrators of the network 310 to dictate that certain types of print content (e.g., breaking news), certain publisher's content, or even certain particular pieces of content be given a higher priority for being processed by engine 311b into synthesized audio. In this manner, for example, current news articles could be given a higher conversion priority than classified advertisements, which in turn are given a higher priority than archived articles.

Following the content preprocessing stage, the audio media files, including both content and advertisements, proceed to information and content storage, as depicted in FIG. 3. The various audio media files are stored in either a content repository database 312a or an advertisement repository database 213b, where they are tagged such that they can be easily accessed, retrieved, and delivered during the next navigation and delivery stage. Content repository database 312a is the primary database of the content acquisition subsystem as it contains all of the synthesized or pre-prepared audio content (e.g., WAV files, MP3 files) for synthesized audio content, plus any associated meta data for the audio files (e.g., publisher, author, subject, information). Advertisement repository database 312b likewise contains all of the audio files and meta data for the advertising spots.

For configuring the operation of the network 310 during the information and content storage stage, a presentation management interface 313b is provided to administrators of the network 310. This interface 313b permits the administrator to define navigation, prompting, presentation, and advertisement insertion rules (NPPAIR) in a NPPAIR database 314c, which rules help sort the audio content and advertisement files in databases 312a and 312b into readily searchable and accessible categories to make content easier to locate for subscriber consumers. Further, database 314c contains rules for inserting the advertisement content within audio content during delivery, as described below, and interface 313b enables MACD network administrators to set these rules.

It should be apparent that the navigation and delivery stage and consumption stage are triggered by activities of individual subscriber consumers. As noted above, embodiments of the present invention may implement targeted advertising to generate revenues for publishers, operators of the mobile audio content delivery network, and cellular service providers. Content and advertising repository database 312 is also adapted to store and catalog advertising audio files for delivery to users as dictated by advertisement insertion rules stored by an administrator in the NPPAIR database 314c.

In operation, for example, when a subscriber consumer is browsing mobile-capable audio content offerings stored in content database 312a (such as by using a mobile web application on their cell phone) and sees an article that they want to listen to they can then select a link that initiates a telephone call into an IVR subsystem (denoted telephony interface in FIG. 3), which forms part of the delivery means 320 of network 310. That IVR subsystem will automatically identify that the user is browsing (e.g., using a mobile web application) with a particular type of device. In this regard, the IVR system may be augmented to establish a multi-modal session going across multiple machine interfaces for browsers and voice/data calls by pushing the user directly into a call for immediate delivery of the requested content. A subscriber consumer therefore is not required to navigate via initial voice navigation menus upon initiation of the call into the IVR telephony interface 315, but rather is taken directly into delivery of the requested content (or brought to the lowest level voice navigation menu to confirm delivery of the requested content).

Additionally and alternatively, a user could use various features of the system 300 to configure various short cuts for obtaining the types of content they want. For example, a user that likes to read the lead articles of a particular newspaper every morning (or other type of frequently updated print content), could request that a series of text messages get pushed to his or her device identifying recently published articles of potential interest. In this regard, one user could get the headlines delivered for the politics section of a newspaper while a second user could request to be notified of any new articles across a wide variety of publishing sources regarding a particular topic, such as business articles on a particular industry of interest. Rather than having to call in and begin navigation via the telephony interface from the top level of the IVR menu, the user could review their customized content list on his or her device and then initiate delivery of interesting content by a single action on their telephone. Equivalently, a similar direct navigation approach to bypass the initial IVR menus of the IVR telephony interface could be provided through WAP or other forms of mobile web. Thus, a user can have ready access to the types of content that they want to listen to, and can initiate playing of the content quickly by a simple click-to-play operation.

Figure 4:
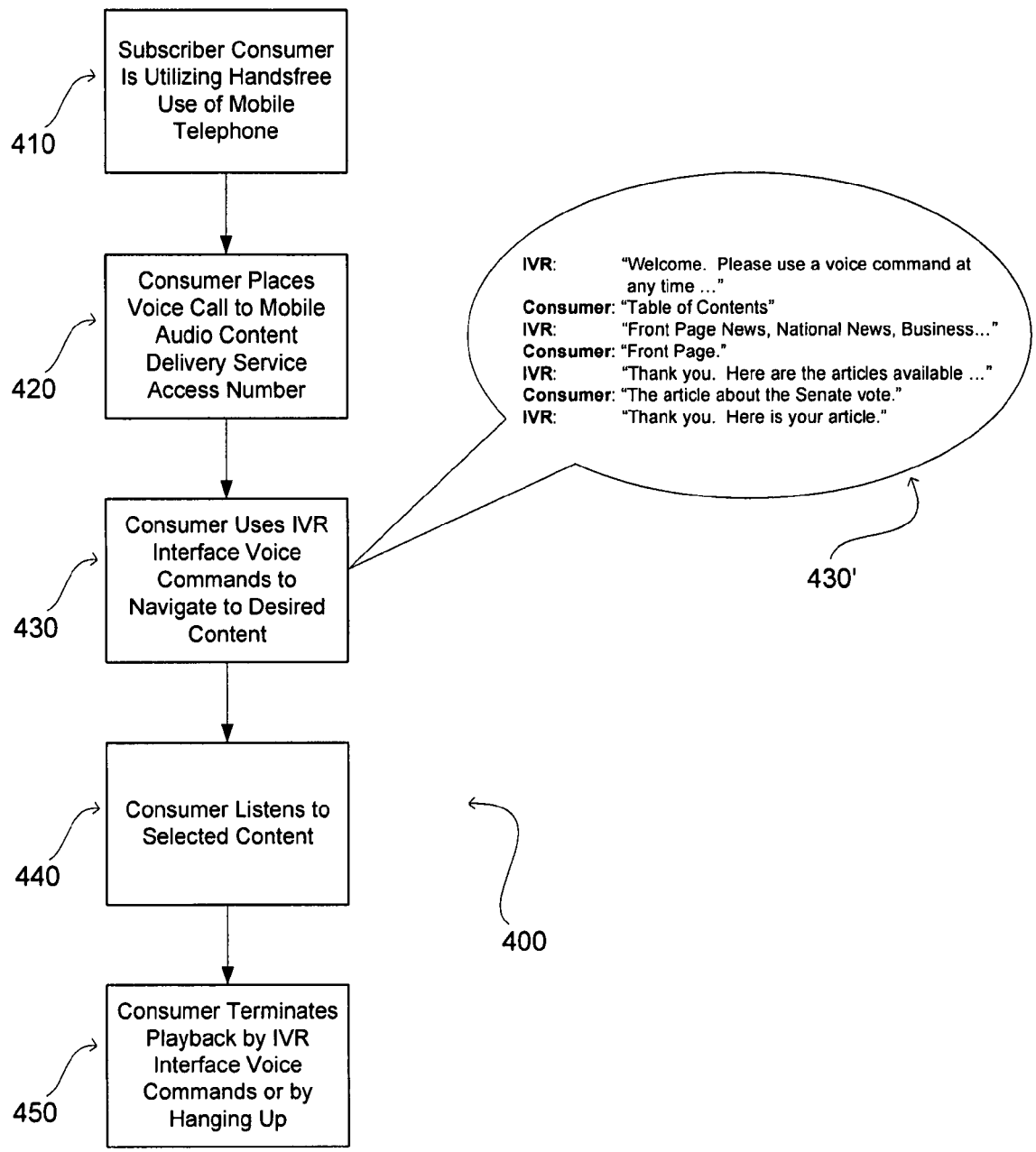
FIG. 4 is a flow diagram depicting a use case for a particular access scenario that may be utilized by subscribers according to one particular embodiment of the present invention.
Figures 5, 6:
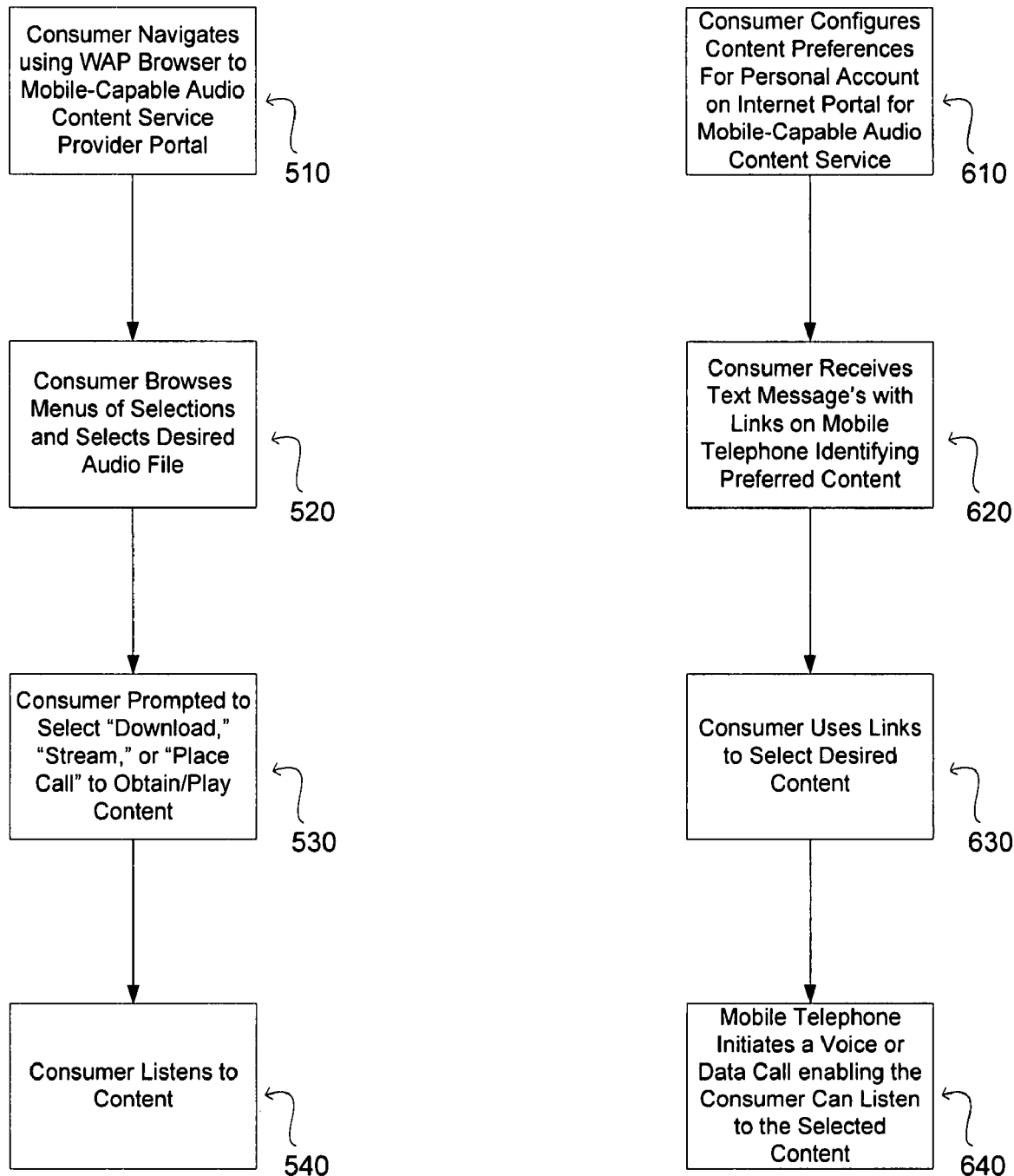
FIG. 5 is a flow diagram depicting a use case for another access scenario that may be utilized by subscribers according to one particular embodiment of the present invention.
FIG. 6 is a flow diagram depicting a use case for yet another access scenario that may be utilized by subscribers according to one particular embodiment of the present invention.

For purposes of illustration, FIG. 4, FIG. 5, and FIG. 6 depict different use cases for particular access scenarios that may be supported by the multi-modal interface according to one preferred embodiment of the present invention. Such use cases are described below in detail.

The user preferences, as indicated generally above, could be set and changed by each subscriber consumer via the user management interface 319. Preferably, this interface 319 includes a web portal that provides individual password-protected accounts for each subscriber consumer once they register to use the MACD service. These accounts would enable the subscriber consumers to update their preferences regarding content choices, content navigation, and content delivery, as well as account billing, and have those preferences stored in a subscriber profile database 316a, which database in turn is accessible by the various networking elements of the delivery means 320. Thus, in embodiments of the present invention a MACD network 310 may also comprise one or more web servers that support this subscriber web portal to provide subscriber consumers with a self-service mechanism for updating their subscription and account information.

For example, a home page could be provided that identifies and describes the various types of content, the different publishers, and the different levels of subscriptions that are available for premium content. Additionally, if a particular user is considering subscribing to a given publisher, he or she can be provided with information regarding costs, a free sample of content, and/or an option to update his or her service agreement by subscribing to a particular content/publisher or canceling a current subscription. Additionally, the web portal may provide a capability to users to review reports regarding what content types of content they have recently used, such as a report detailing what content from which publishers a given user has listened to in the previous month or to configure their profile. Furthermore, users may be permitted to configure notification parameters to define what types of articles they want to receive instant text message notifications about.

NPPAIR database 314c contains various delivery rules defined via the presentation management interface 313b by administrators that define various ways how the content stored in the content repository database 312a is used. These delivery rules, for example, define how all content for a particular publisher will be organized and presented to subscribers for navigation. A newspaper publisher may wish for its mobile-capable audio content to be presented to subscribers organized in a manner that parallels their print presentation of that content. A given publisher, for example, in this manner might want its mobile-capable audio content organized by front page articles, editorials, sports, life, technology, money, financial, etc. NPPAIR database 314c also provides any given advertiser with the ability to define delivery rules that dictate how advertisements in advertisement repository database 312b are positioned with respect to its mobile-capable audio content. In this regard, a particular publisher might request (and a suitable delivery rule would be defined to ensure) that a first piece of advertising is run X number of times a second piece of advertising is to run Y number of times, but that the first should be run at certain times of day for a certain topical area of content while the second is run only to subscribers calling from a limited geographic and requesting content from a different topical area. In this regard, publishers can accommodate wishes of their advertisers to make certain that, for example, medical advertisements are run with content categorized into the lifestyle or technology sections, while advertisements for financial services by a brokerage house are run with content taken from that publisher's financial section.

In preferred embodiments of the present invention, the navigation and delivery system of the mobile audio content delivery network will not only insert advertisements into delivered content (such as placing a selected ad before a requested article while providing the user with the chance to "opt out" of listening to the entire advertisement by the pressing of a key on their keypad), but will also track advertisement information and content usage information to increase the effectiveness of the advertising using an analytics engine within the delivery means 320. The analytics engine 3 automatically tracks to what types of content particular subscriber consumers frequently listen and stores that information user demographics information within or otherwise associated with subscriber profile database 316a so that that usage information may be analyzed to increase the effectiveness of advertising. The demographics information thus identifies which subscribers access what content, when they accessed it, and what portions they listened to so as to provide multi-dimensional analyses to advertisers and publishers that report how many customers listen to advertisements of a certain type, or placed along certain types of content, the frequency of "click-through" or "speak-through" interactions with advertisements, etc.

In this regard, the information collected and stored in the subscriber profile database 316a of the MACD network 310 would enable conclusions to be drawn regarding the types of information, products, and services that would be of high interest to a given user. By tracking what kind of mobile audio content delivery content to which a given user listens one can make educated guesses regarding whether a user is interested in sports, home care, politics, and the like. Understandably, such information could also provide insight into a particular subscriber's gender, income, and age. Such information, as described elsewhere herein, will allow advertisers to target particular advertisements specifically at users in conjunction with or independent of demographic (or geographic) information provided by the cell phone company.

Furthermore, whenever a subscriber is interacting with their mobile phone for accessing mobile audio content delivery content, it will be possible to know exactly when they're calling and (with cooperation of their cellular provider) roughly where they're calling from. This makes specific geographic targeting of advertising possible. For example, it is conventional for movies studios to launch heavy promotions of new movies in the week before they actually launch. If, for example, a given movie debuts nationally on a Thursday, heavy print, radio and TV advertising would be reserved for Monday through Wednesday of that week). Additionally, however, many movies have a staggered debut date, wherein the launch first in certain limited places (like New York city and Los Angeles) a few days before they go into wide release. The ability to target advertisements according to the present invention on both a temporal and geographic basis can allow studios to concentrate mobile audio content delivery advertising only to those people in the New York and Los Angeles area codes during a given time period.

Also as depicted in FIG. 3, mobile audio content delivery network 310 includes an accounting and settlements interface 318 that enables administrators to generate and provide reports from the settlements database 316b. These reports could be produced regularly, such as at the end of the month, to participating publishers, advertisers and/or wireless service providers summarizing the number of subscribers to the mobile audio content delivery over the last month, the number of advertisements run, etc., and generates invoices requesting payments according to service level agreements for the advertisements, usage agreements, and content arrangements. Publishers and advertisers will find such reports helpful as they will describe how many subscribers consumed particular types of content, how many click-throughs/speak-throughs were experienced with given ads. Publishers could also utilize such reports to set expectations for revenue sharing for upcoming months, and operators of the mobile audio content delivery network could utilize such reports to justify charges to publishers and/or advertisers.

Understandably, publishers as well as the advertisers may operate jointly or separately with regard to associating advertisements with content. In this regard, established publishers can rely upon their existing advertising relationships to schedule advertisements for their content presented in the mobile audio content delivery format. A publisher could dictate what content gets configured for mediacast delivery and what exact advertisements get paired with particular mobile-capable audio content. Alternatively, where there are a significant number of publishers cooperating on a single mobile audio content delivery network, multiple publishers and/or a mobile audio content delivery service provider may collectively approach advertisers directly for cultivating group advertisement relationships specific to the mobile audio content delivery content area. Publishers then don't have to go out and manage advertising relationships. Of course, in such situations it would be expected that publishers and/or advertisers would still place restrictions preventing associations with certain advertisers, certain content areas, etc., allowing publishers and advertisers to opt-in and opt-out with respect to with whom they deal.

Turning now to FIG. 4, there is depicted a flow diagram depicting a sample process 400 by which a subscriber consumer according to one particular embodiment of the present invention could interact with an IVR telephony interface of a MACD network. In process 400, the subscriber consumer is using the handsfree feature of his mobile telephone at step 410 (such as with a Bluetooth or wired headset), and places a regular voice telephone call to a telephone access number associated with the MACD service at step 420. This telephone call connects the consumer to the IVR telephony interface of the MACD network, which prompts the consumer with audio commands to speak certain navigation commands at step 430 to identify and select appropriate content and to begin playback, as reflected in sample script 430'. The consumer thereafter listens to the selected content at step 440, and the user terminates playback either by using present IVR interface commands (e.g., "stop playback") or by hanging up at step 450.

FIG. 5 is a flow diagram depicting a second sample process 500 by which a subscriber consumer according to one particular embodiment of the present invention could interact with a mobile web (e.g., WAP) interface of a MACD network via their mobile device. Process 500 begins with the subscriber consumer navigating using the WAP browser of their mobile telephone at step 510 to a mobile web portal associated with the MACD service. The consumer browses at step 520 menus of available content, makes various menu choices, and eventually selects one or more desired audio files. At step 530, the consumer is prompted after making the content selection(s) to select how they want to receive the content (i.e., download, stream, playback via voice call, etc.). The consumer thereafter listens to the content at step 540 in the manner dictated by the selection at step 530.

FIG. 6 is a flow diagram depicting a third sample process 600 by which a subscriber consumer according to one particular embodiment of the present invention could utilize the subscriber web portal to simplify audio content selection and playback. At step 610, the subscriber consumer logs in to his personal account on the MACD service's web portal and configures content preferences, including the identification of certain types of content for which he desires to receive notifications. At step 620, the consumer later receives a text message on his mobile telephone from the MACD service. This text message provides links (such as mobile web URL addresses that link directly to a content page) for each content file that meet the criteria preset by the consumer. Next, at step 630, the user uses the links to select desired content, which, for example, could automatically launch the mobile web client of the consumer's mobile telephone and direct it to a particular URL for the selected content or a specific URL for the consumer. Alternatively, as depicted in FIG. 6, the mobile telephone could initiate a voice or data call to the MACD network at step 640, which call is automatically detected by the MACD network and causes immediate playback of the associated content.

Figure 7:
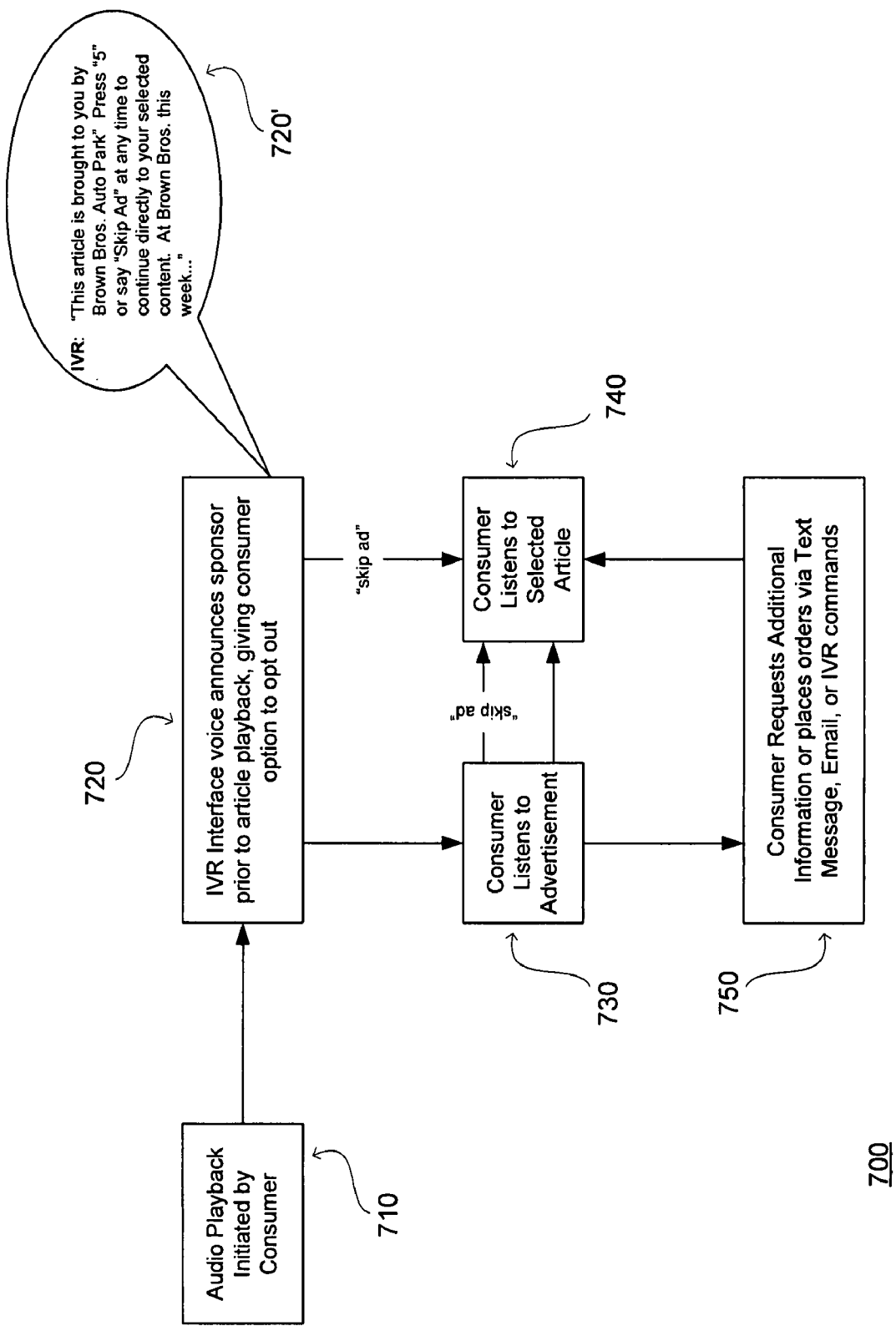
FIG. 7 is a flow diagram depicting a use case for a typical subscriber advertisement experience that may be provided according to on particular embodiment of the present invention.

For purposes of further illustration regarding how advertisements can be integrated with audio content playback, FIG. 7 provides a flow diagram depicting a sample advertisement process 700 that may be provided according to a preferred embodiment of the present invention. Process 700 starts at step 710 with the audio content playback being initiated by the subscriber consumer (such as according to the voice call mechanism illustrated above in FIG. 4). The IVR telephony interface announces the sponsor immediately prior to audio content playback at step 720 using a pre-recorder advertisement announcement script 720'. During playback of script 720', the user at any time may say "skip ad," which command will transition the consumer immediately from listening to the advertisement (step 730) to listening to the selected article (step 740). If the consumer listens to the entire advertisement at step 730 without saying "skip ad," then playback of the selected article begins (step 740). Further, as depicted in FIG. 7, at any time during playing of the advertisement, the consumer may use one or more IVR interface voice commands to request additional information regarding the advertisement (such as via text message or email), or follow up on the advertisement by, for example, placing e-commerce orders.

Figure 8:
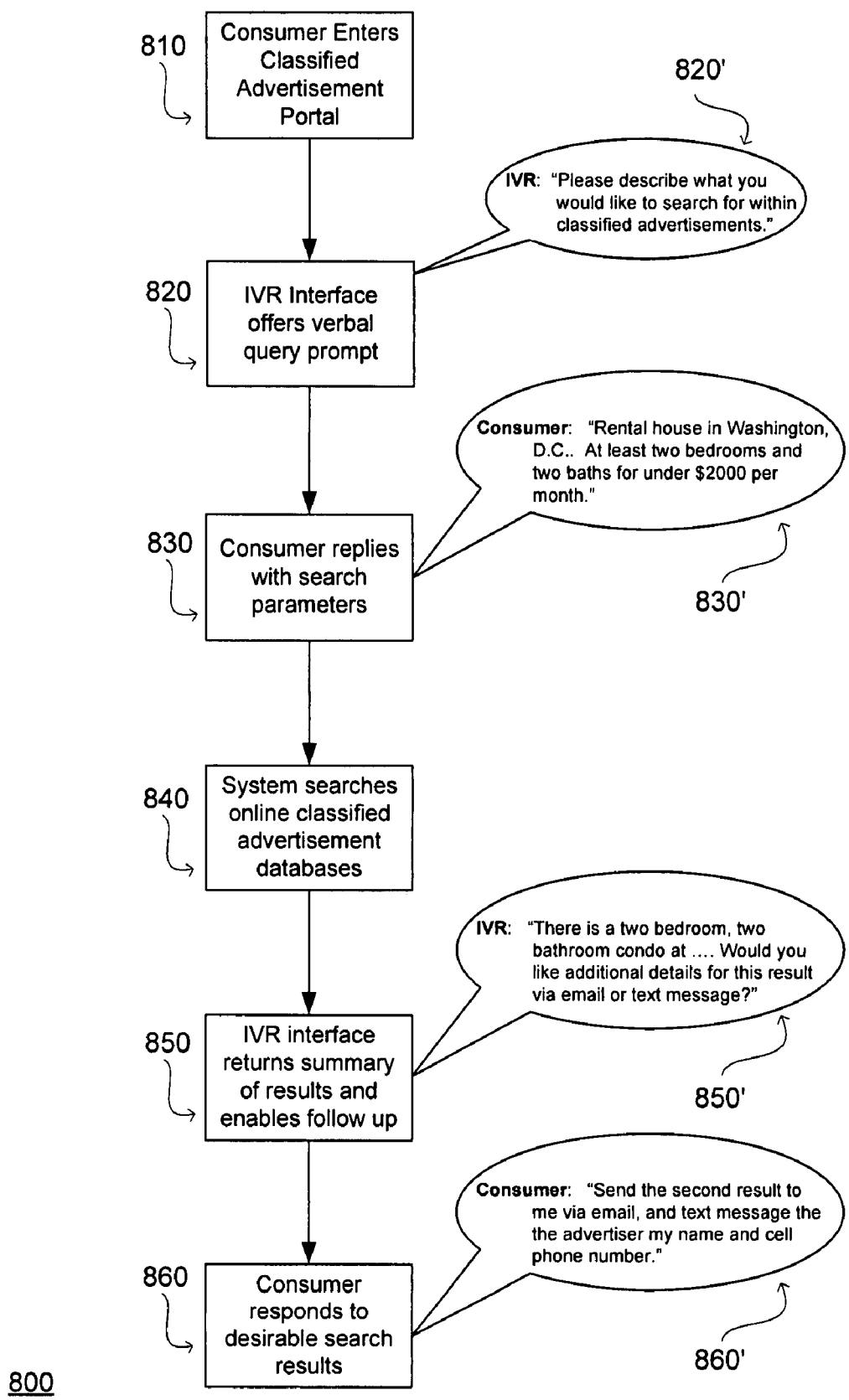
FIG. 8 is a flow diagram depicting a use case for a typical subscriber interactive classified advertisement experience that may be provided according to a preferred embodiment of the present invention.

One other preferred embodiment of the present invention utilizes classified advertisements in a mobile-capable audio content format. Such classified advertisements according to such preferred embodiments of the present invention provide a capability for the consumer to search classified advertisement listings on the go while also being able to interact with classified advertisements of interest. For purposes of illustration, FIG. 8 provides a flow diagram depicting an interactive classified advertisement process 800 that may be provided according to a preferred embodiment of the present invention. Process 800 utilizes the example of someone looking for a new rental home, and begins with a subscriber consumer entering a classified advertisement section of the MACD service at step 810, such as by using the IVR telephony interface. Once they have navigated to the classified ads content via the IVR portal, the consumer is prompted by the IVR interface to speak into his classified advertisement query at step 820 (such as by prompt script 820'). At step 830, the consumer replies verbally with his search parameters, for example describing his need for a rental home in northwest Washington, D.C. having a maximum rent of $2,000 (as reflected in reply script 830'). The IVR interface would then interact with a classified advertisements search engine at step 840 to parse the verbal search parameters perform a search for classified advertisements for rental homes meeting that qualification and then begin to read them back over the telephone. Understandably, this search could access a variety of online databases in real time. Once the search is completed, at step 850, the IVR interface provides a summary of results (such as by reading summaries of each match as shown in results script 850'). and enables follow up by the subscriber. Subscribers could use voice commands such as "next," "back," "repeat," "delete" or "save" to sift through the search results. Also, for example, if the user wanted more information on a given advertisement, he or she could respond at step 860 by speaking a request for follow up actions or information (see response script 860' in FIG. 8).

Another advantageous feature of certain preferred embodiments of the present invention is that a newspaper publisher, for example, may often do reviews of restaurants and movies. Understandably, such reviews form suitable print content that can be converted into mobile-capable audio content like many other topical areas of print content. However, such reviews in particularly preferred embodiments of the invention can also be made interactive in much the same manner as classified advertisements are. Upon navigating to and listening to a review of a specific restaurant, for example, if the user wanted to make a reservation they could speak voice commands to electronically explore reservation availabilities and make reservations for the restaurant (if the particular restaurant participates in such electronic or online reservation services), to have the restaurant's telephone number sent to them as a text message for later follow up, or to have their phone call forwarded to the phone number for the restaurant to make the reservation in conventional fashion.

Similarly, such preferred embodiments of the invention may allow subscribers to link from a review of a concert or some other kind of an event (e.g., a movie), or even if it's not a review but rather a listing of a concert or an event, to an e-commerce ticketing capability for that same event.

In various embodiments of the invention, it is possible that users will be required to utilize their cell phone minutes to access to mobile audio content delivery service unless agreements are made between the operator of the mobile audio content delivery network and the cell phone service provider network. In an alternative embodiment, agreements could be established with cellular telephone service providers such that a subscriber's cell phone minutes are not being used and then, of course, there would be billing and settlement features associated with it. The particular arrangement chosen, of course, can vary on implementation to implementation and, optionally, even on a user by user basis.

Furthermore, in other alternative embodiments of the present invention, the mobile audio content delivery network can optionally include speech-to-text ("STT") capabilities integrated within the IVR menu options. When such STT capabilities are included, it would be possible for users to dial into the mobile audio content delivery network via their mobile device and record voice messages which are then converted into text by, for example, a commercial STT software application. In this manner, the mobile audio content delivery network would be able to be used by registered users as a means for converting audio notes into text messages that can be stored on their telephone (or received at a preset time in the future as dictated by the user). Such functionality could be useful for the preparation of, for example, shopping lists and other reminders.

Figure 9:
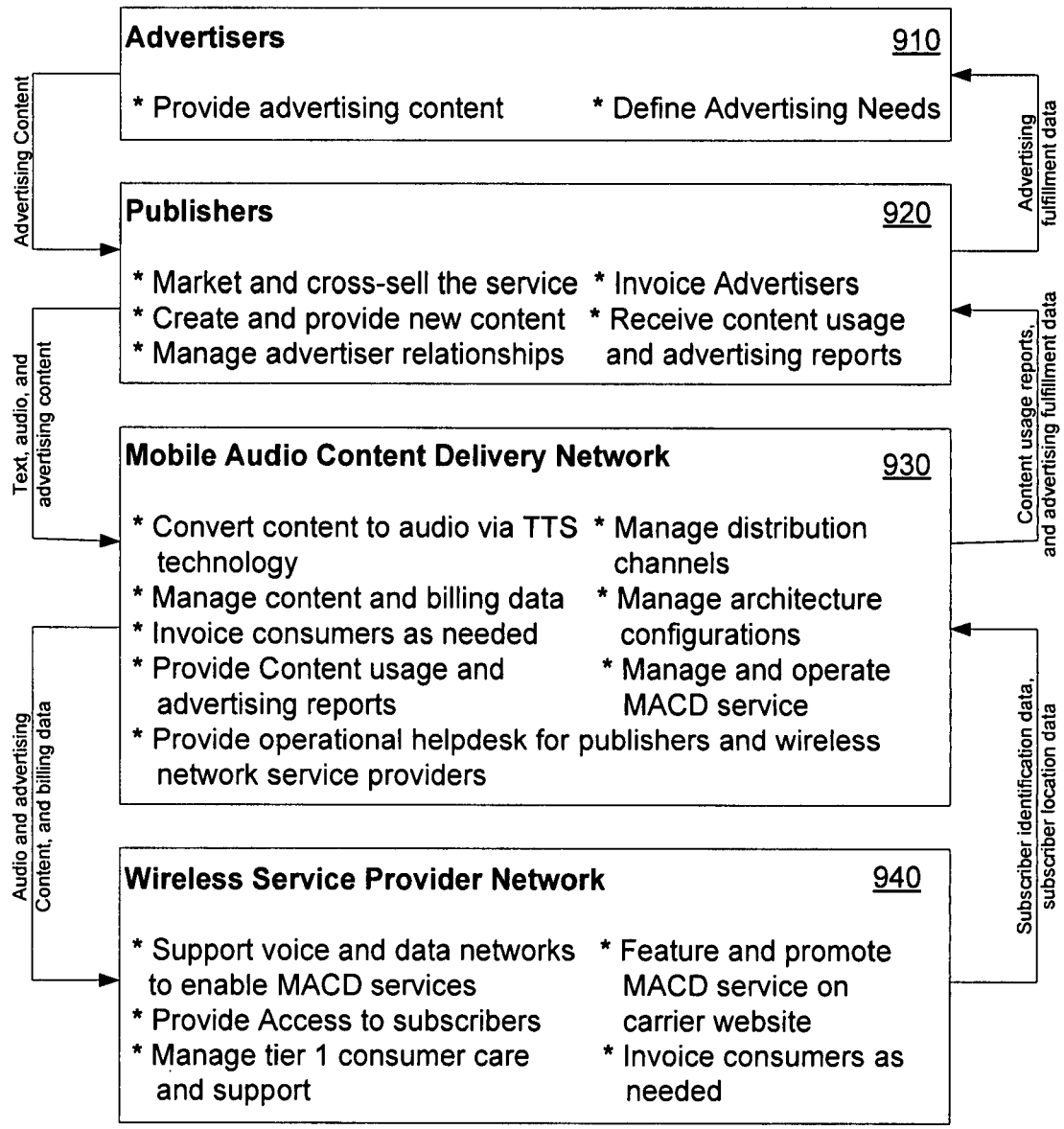
FIG. 9 is a schematic diagram illustrating an operations model and related process flows and responsibilities for a preferred implementation of a mobile audio content delivery system according to embodiments of the present invention.
Figure 10:
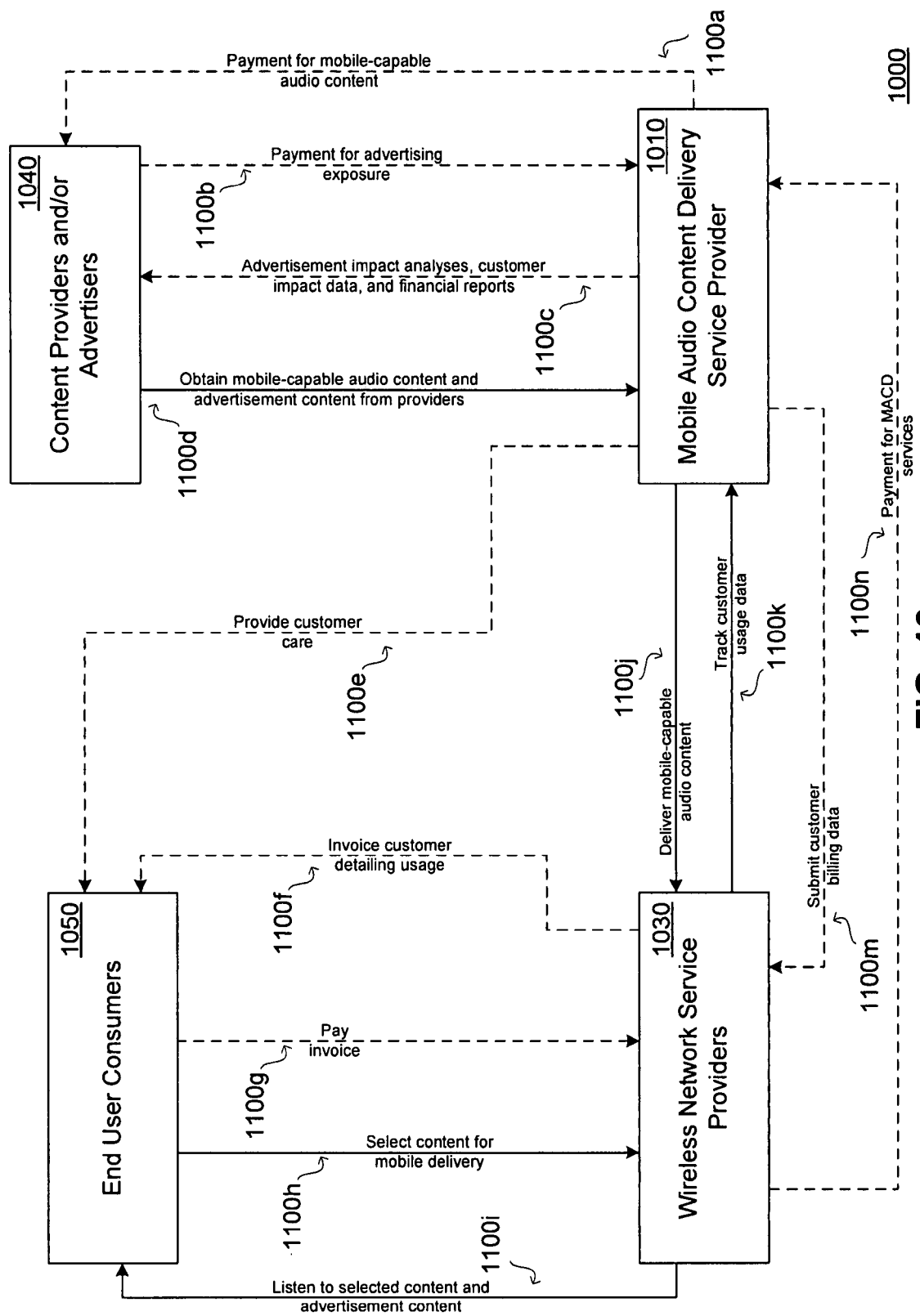
FIG. 10 is a combination schematic and flow diagram showing information flows between various elements of a mobile audio content delivery system according to embodiments of the present invention.

Turning now to FIG. 9, there is depicted an operations model 900 that depicts the various process flows and responsibilities for advertisers 910, publishers 920, the MACD network 930, and the wireless service provide network 940 according to embodiments of the present invention. As shown in FIG. 9, each entity (e.g., 910-940) has its own set of responsibilities that it fulfills (represented by the bullet point items within each entity), and provides various information, deliverables and requests to other entities (represented by the labeled information flow arrows). FIG. 10 is a combination schematic and flow diagram that further illustrates these information flows between various entities that interact in the mobile audio content delivery system.

As shown in FIG. 10, MACD system 1000 connects one or more subscriber consumers 1050 who have mobile devices adapted to communicate via the networks of one or more wireless network service providers 1030 with the MACD network operated by the MACD network service provider 1010. The MACD network service provider 1010 in turn deals directly with content providers and advertisers 1040. In FIG. 10, the various arrows between entities 1010-1040 distinguish between information exchanges relating to content collection, production, and delivery (solid arrow lines), and information exchanges relating to support functions, such as billing and usage data (dotted arrow lines).

As depicted in FIG. 10, the content providers and advertisers 1040 interact only with the MACD service provider 1010 by providing content (flow 1100d) in the form of text or audio media. In exchange for the content, the content providers receive payment for use of the content (flow 1100a), and the advertisers make payments for placement of their announcements (flow 1100b). Further, the MACD service provider 1010 could provide periodic advertisement impact analyses, customer data, and other such financial reports (flow 1100c) to the advertisers.

Various flows also connect the wireless network service providers 1030 with the MACD service provider 1010 as shown in FIG. 10. In particular, the MACD service provider 1010 delivers mobile-capable audio content (flow 1100j) and submits customer billing data (flow 1100m) to the wireless network service providers 1030, while it in turn simultaneously collects customer usage data (flow 1100k) and receives payments for use of the MACD services (flow 1100n) from the providers 1030.

Finally, the subscriber consumers 1050 interact with the wireless network providers 1030 in various ways. As shown, the subscriber consumers 1050 select, receive and/or listen to mobile-capable audio content (flows 1100i and 1100h) via the wireless network service providers 1030, and receive and pay invoices relating to usage of the wireless network (flows 1100f and 1100g). The MACD service provider also provides various customer care functions (flow 1100e) to the subscriber consumers, as depicted.

Various processes and methods described herein may be implemented using software stored in the memory for execution by suitable processors. Alternatively, the mobile devices and/or servers may implement such processes and methods in hardware or a combination of software and hardware, including any number of processors independently executing various programs and dedicated hardware, such as application specific integrated circuits (ASICs), field programmable gate arrays (FPGAs), and the like.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims. Although the invention has been described and illustrated with a certain degree of particularity, it is understood that the present disclosure has been made only by way of example, and that numerous changes in the combination and arrangement of steps or orientation of parts can be resorted to by those skilled in the art without departing from the spirit and scope of the invention, as hereinafter will be later claimed.

What is claimed is:

1. A mobile audio content delivery ("MACD") system for collecting and converting print media and delivering said media in the form of audio content to a plurality of subscribers, said MACD system comprising:

one or more wireless service provider networks, said wireless service provider networks providing wireless communication access to said subscribers via mobile devices and including a mobile telephone core network;

one or more print media input sources that produce said print media; and a MACD network in electronic communication with said wireless service provider networks, said MACD network including a content acquisition subsystem adapted to collect said print media from said input sources and including a content processing engine for transforming said collected print media into audio content files, a content repository database for storing said audio content files, and means for delivering said audio content files to said mobile devices of said subscribers on demand via said wireless service provider networks;

wherein said means for delivering said audio content files comprises a multi-modal interface that enables said subscribers to use different mechanisms for browsing, navigating, and selecting desired audio content files from said content repository database and playing back said desired audio content files, and wherein said audio content files being tagged and cataloged in said content repository database according to content categories.

2. The MACD system according to claim 1, wherein said multi-modal interface includes an initial service interface adapted to communicate with said wireless service provider network and an interactive voice recognition ("IVR") telephony interface supporting a voice operated menu system for interaction with subscribers.

3. The MACD system according to claim 2, wherein said multi-modal interface further includes an audio streamer subsystem for streaming said desired audio files over calls initiated by mobile devices via said wireless service provider network.

4. The MACD system according to claim 1, wherein said multi-modal interface includes an initial service interface adapted to communicate with said wireless service provider network and webserver subsystem having messaging engines and web serving engines, said webserver subsystem enabling said subscribers to communicate with said means for delivering using mobile web protocols.

5. The MACD system according to claim 1, wherein said MACD network further includes a billing and settlements subsystem in electronic communication with said means for delivering, said billing and settlements subsystem including a settlements database, said billing and settlements subsystem being adapted to track subscriber interaction with said MACD network as content data entries in said settlements database describing what audio content files are delivered.

6. The MACD system according to claim 5, wherein said means for delivering is adapted to deliver advertisement files with said desired audio content files to subscribers, and said billing and settlements subsystem is further adapted to track subscriber interaction with said delivered advertisements as advertising data entries in said settlements database.

7. The MACD system according to claim 1, wherein said MACD network further comprises a subscriber user interface including a secure web portal wherein subscribers can set and update content preferences, delivery preferences, and account management information for said MACD network.

8. The MACD system according to claim 7, wherein said content preferences include an identification of preferred types of audio content for which a given subscriber wants simplified access.

9. The MACD system according to claim 8, wherein said simplified access includes customized menu selections made available to the given subscriber via an interactive voice recognition ("IVR") telephony interface or a mobile web access page.

10. The MACD system according to claim 8, wherein said means for delivering is adapted to send text messages to mobile devices of said given subscriber to notify said given subscriber regarding new audio content files classified as said preferred types of audio content.

11. The MACD system according to claim 10, wherein said text messages include links that assist said given subscriber in effectuating said simplified access and subsequent delivery of said new audio content.

12. The MACD system according to claim 1, wherein said print media input sources include classified advertisements, and wherein said means for delivering includes means for subscribers to conduct searches of said classified advertisements and listen to search results.

13. The MACD system according to claim 1, wherein said content preprocessing engine is controlled by a database of preset preprocessing rules that dictate context sensitive treatment for said transforming said print media into audio content files.

14. The MACD system according to claim 1, wherein said print media input sources include publisher websites, really simple syndication ("RSS") Internet feeds, publisher content management systems, and professional blogger websites.

15. The MACD system according to claim 1, wherein said content acquisition system is further adapted to collect media content already in audio format selected from the group consisting of podcasts and advertiser announcements.

16. A mobile audio content delivery ("MACD") system for collecting and converting print media and delivering said media in the form of audio content to a plurality of subscribers, said MACD system comprising:

one or more wireless service provider networks, said wireless service provider networks providing wireless communication access to said subscribers via mobile devices and including a mobile telephone core network;

one or more print media input sources that produce said print media; and a MACD network in electronic communication with said wireless service provider networks, said MACD network including a content acquisition subsystem adapted to collect said print media from said input sources and including a content processing engine for transforming said collected print media into audio content files, a content repository database for storing said audio content files, and means for delivering said audio content files to said mobile devices of said subscribers on demand via said wireless service provider networks;

wherein said means for delivering said audio content files comprises a multi-modal interface that enables said subscribers to use different mechanisms for browsing, navigating, and selecting desired audio content files from said content repository database and playing back said desired audio content files, wherein said means for delivering is adapted to deliver advertisement files with said desired audio content files to subscribers, and said billing and settlements subsystem is further adapted to track subscriber interaction with said delivered advertisements as advertising data entries in said settlements database, and wherein said billing and settlements subsystem is further adapted to generate billing reports regarding said content data entries and said advertising data entries from said settlements database.

17. The MACD system according to claim 16, wherein at least one of said wireless service provider networks contract with said MACD network to provide MACD services to mobile users of said at least one wireless provider network, and wherein said billing reports are transferred to said at least one wireless provider network periodically to generate invoices to ones of said mobile users that subscribe to said MACD services.

18. A mobile audio content delivery ("MACD") system for collecting and converting print media and delivering said media in the form of audio content to a plurality of subscribers, said MACD system comprising:

one or more wireless service provider networks, said wireless service provider networks providing wireless communication access to said subscribers via mobile devices and including a mobile telephone core network;
one or more print media input sources that produce said print media; and
a MACD network in electronic communication with said wireless service provider networks, said MACD network including a content acquisition subsystem adapted to collect said print media from said input sources and including a content processing engine for transforming said collected print media into audio content files, a content repository database for storing said audio content files, and means for delivering said audio content files to said mobile devices of said subscribers on demand via said wireless service provider networks;
wherein said means for delivering said audio content files comprises a multi-modal interface that enables said subscribers to use different mechanisms for browsing, navigating, and selecting desired audio content files from said content repository database and playing back said desired audio content files,
wherein said means for delivering is adapted to deliver advertisement files with said desired audio content files to subscribers, and said billing and settlements subsystem is further adapted to track subscriber interaction with said delivered advertisements as advertising data entries in said settlements database, and wherein said billing and settlements subsystem is further adapted to generate demographic reports regarding specific subscribers based upon said content data entries and said advertising data entries from said settlements database, said demographic reports being useful for targeting advertisement files to said specific subscribers.

19. A mobile audio content delivery ("MACD") system for collecting and converting print media and delivering said media in the form of audio content to a plurality of subscribers, said MACD system comprising:
one or more wireless service provider networks, said wireless service provider networks providing wireless communication access to said subscribers via mobile devices and including a mobile telephone core network;
one or more print media input sources that produce said print media; and
a MACD network in electronic communication with said wireless service provider networks, said MACD network including a content acquisition subsystem adapted to collect said print media from said input sources and including a content processing engine for transforming said collected print media into audio content files, a content repository database for storing said audio content files, and means for delivering said audio content files to said mobile devices of said subscribers on demand via said wireless service provider networks;
wherein said means for delivering said audio content files comprises a multi-modal interface that enables said subscribers to use different mechanisms for browsing, navigating, and selecting desired audio content files from said content repository database and playing back said desired audio content files, and wherein said content acquisition subsystem includes a content acquisition engine controlled by a database of preset scheduling and source rules to automatically collect print media electronically from said sources and transfer said collected print media to said content preprocessing engine.

20. A mobile audio content delivery ("MACD") system for collecting and converting print media and delivering said media in the form of audio content to a plurality of subscribers, said MACD system comprising:
one or more wireless service provider networks, said wireless service provider networks providing wireless communication access to said subscribers via mobile devices and including a mobile telephone core network;
one or more print media input sources that produce said print media; and
a MACD network in electronic communication with said wireless service provider networks, said MACD network including a content acquisition subsystem adapted to collect said print media from said input sources and including a content processing engine for transforming said collected print media into audio content files, a content repository database for storing said audio content files, and means for delivering said audio content files to said mobile devices of said subscribers on demand via said wireless service provider networks;
wherein said means for delivering said audio content files comprises a multi-modal interface that enables said subscribers to use different mechanisms for browsing, navigating, and selecting desired audio content files from said content repository database and playing back said desired audio content files, and wherein said MACD network further comprises a presentation management interface for use by administrators to dictate rules for inserting advertising into delivery of said desired audio content files.

21. The MACD system according to claim 20, wherein said means for delivering includes an initial service interface, a interactive voice recognition ("IVD") telephony interface, a webserving subsystem, and an audio streamer subsystem.

22. A mobile audio content delivery ("MACD") process for collecting and converting print media and delivering said media in the form of audio content to a plurality of subscribers, said MACD process comprising:
establishing a MACD network, said MACD network including a content acquisition subsystem that includes a content processing engine, a content repository database, and means for delivering audio files;
collecting digital print media with said content acquisition subsystem from one or more input sources electronically;
transforming said collected digital print media into audio content files with said content processing engine;
storing said audio content files in said content repository database, said stored content files being tagged and cataloged in said content repository database according to content categories;
receiving requests from subscribers via a wireless service provider network, said wireless service provider networks providing wireless communication access to said subscribers via mobile devices of said subscribers, said requests relating to particular audio content files stored in said content repository database; and
delivering said particular audio content files from said content repository database via said wireless service provider network to appropriate mobile devices for appropriate subscribers making said requests; wherein said means for delivering said audio content files comprises a multi-modal interface that enables said subscribers to use different mechanisms for browsing, navigating, and selecting said particular audio content files from said content repository database during said requests.

23. The MACD process according to claim 22, wherein said multi-modal interface includes an initial service interface adapted to communicate with said wireless service provider network and an interactive voice recognition ("IVR") telephony interface supporting a voice operated menu system for interaction with said subscribers.

24. The MACD process according to claim 23, wherein said multi-modal interface further includes an audio streamer subsystem for streaming said desired audio files over calls initiated by mobile devices via said wireless service provider network.

25. The MACD process according to claim 22, wherein said multi-modal interface includes an initial service interface adapted to communicate with said wireless service provider network and webserver subsystem having messaging engines and web serving engines, said webserver subsystem enabling said subscribers to communicate said requests using mobile web protocols.

26. The MACD process according to claim 22, wherein said MACD network further includes a billing and settlements subsystem in electronic communication with said means for delivering, said billing and settlements subsystem including a settlements database, said process further comprising tracking subscriber interaction with said MACD network as content data entries in said settlements database, said content data entries describing what audio content files are delivered.

27. The MACD process according to claim 26, further comprising delivering advertisement files with said particular audio content files to subscribers, and tracking subscriber interaction with said delivered advertisements as advertising data entries in said settlements database.

28. The MACD process according to claim 27, further comprising generating billing reports regarding said content data entries and said advertising data entries from said settlements database.

29. The MACD process according to claim 22, wherein said requests are initiated by said subscribers in response to text messages received from said MACD network, said text messages including links that assist a given subscriber in effectuating simplified access to and subsequent delivery of newly created audio content files.

30. The MACD process according to claim 22, wherein said print media input sources include classified advertisements, and wherein said means for delivering includes means for subscribers to conduct searches of said classified advertisements and listen to search results.

31. The MACD process according to claim 22, wherein said print media input sources include publisher websites, really simple syndication ("RSS") Internet feeds, publisher content management systems, and professional blogger websites that are all electronically accessible by said MACD network.

* * * * *